United States Patent
Ludolph et al.

(10) Patent No.: US 8,732,597 B2
(45) Date of Patent: May 20, 2014

(54) FOLDED SCROLLING

(75) Inventors: Frank E. Ludolph, Menlo Park, CA (US); Braden F. Kowitz, Palo Alto, CA (US); Jacob E. Pierson, South Pasadena, CA (US); Jessica F. Smith, Keller, TX (US); Aditya S. Chand, Uttaranchal (IN); Chirag Nangia, Cambridge, MA (US)

(73) Assignee: Oracle America, Inc., Redwood Shores, CA (US)

( * ) Notice: Subject to any disclaimer, the term of this patent is extended or adjusted under 35 U.S.C. 154(b) by 966 days.

(21) Appl. No.: 11/331,547

(22) Filed: Jan. 13, 2006

(65) Prior Publication Data

US 2007/0168875 A1 Jul. 19, 2007

(51) Int. Cl.
*G06F 9/00* (2006.01)
*G06F 3/0481* (2013.01)
*G06F 3/0485* (2013.01)

(52) U.S. Cl.
CPC ............ *G06F 3/0481* (2013.01); *G06F 3/0485* (2013.01)
USPC ............ 715/764; 715/810; 715/841; 715/853

(58) Field of Classification Search
CPC .............................. G06F 3/0485; G06F 3/0481
USPC .................. 715/264, 854, 841, 764, 810, 853
See application file for complete search history.

(56) References Cited

U.S. PATENT DOCUMENTS

| | | | | |
|---|---|---|---|---|
| 5,588,107 A * | 12/1996 | Bowden et al. | ............... | 715/828 |
| 5,677,708 A * | 10/1997 | Matthews et al. | ............. | 345/684 |
| 6,025,843 A * | 2/2000 | Sklar | .............................. | 715/841 |
| 6,028,602 A * | 2/2000 | Weidenfeller et al. | ........ | 715/781 |
| 6,084,585 A * | 7/2000 | Kraft et al. | ..................... | 715/733 |
| 6,236,400 B1 * | 5/2001 | Guerrero | ......................... | 715/841 |
| 6,252,597 B1 * | 6/2001 | Lokuge | .......................... | 715/841 |
| 6,262,727 B1 * | 7/2001 | Lentz et al. | .................... | 715/866 |
| 6,298,321 B1 * | 10/2001 | Karlov et al. | .................... | 704/10 |
| 6,433,797 B1 * | 8/2002 | Zellweger | ....................... | 715/762 |
| 6,734,883 B1 * | 5/2004 | Wynn et al. | .................... | 715/830 |
| 6,750,864 B1 * | 6/2004 | Anwar | .......................... | 345/440 |
| 6,880,132 B2 * | 4/2005 | Uemura | ........................ | 715/848 |
| 6,961,731 B2 * | 11/2005 | Holbrook | ............................. | 1/1 |
| 6,990,638 B2 * | 1/2006 | Barksdale et al. | ............. | 715/853 |
| 6,993,723 B1 * | 1/2006 | Danielsen et al. | ............. | 715/751 |
| 7,337,395 B2 * | 2/2008 | Reinhardt et al. | ............. | 715/249 |
| 7,562,312 B2 * | 7/2009 | Rochford et al. | ............. | 715/848 |
| D599,366 S * | 9/2009 | Brown et al. | ................. | D14/485 |
| D599,371 S * | 9/2009 | Brown et al. | ................. | D14/485 |
| 2002/0152222 A1 * | 10/2002 | Holbrook | .................... | 707/104.1 |

(Continued)

*Primary Examiner* — Stephen Hong
*Assistant Examiner* — Marshon Robinson
(74) *Attorney, Agent, or Firm* — Park, Vaughan, Fleming & Dowler LLP

(57) ABSTRACT

A system that displays content on a computer display. During operation, the system displays the content items within a display area on the computer display, wherein content items surrounding a current point of interest are displayed within a visible region of the display area. If the visible region has insufficient space to display some of the content items, the system selects a portion of the content items to be collapsed. Next, the system collapses the selected content items into one or more folds within the display area, wherein a fold is a compact representation of a contiguous group of adjacent content items and is located in place of the contiguous group of adjacent content items. For each fold, the system then displays a summary of the collapsed content items in the fold.

20 Claims, 6 Drawing Sheets

(56) References Cited

U.S. PATENT DOCUMENTS

| | | | |
|---|---|---|---|
| 2003/0081013 A1* | 5/2003 | Allen et al. | 345/853 |
| 2003/0084445 A1* | 5/2003 | Pilat | 725/44 |
| 2003/0131215 A1* | 7/2003 | Bellew | 712/200 |
| 2003/0202019 A1* | 10/2003 | Detweiler et al. | 345/853 |
| 2004/0100479 A1* | 5/2004 | Nakano et al. | 345/700 |
| 2005/0044487 A1* | 2/2005 | Bellegarda et al. | 715/511 |
| 2005/0149977 A1* | 7/2005 | Nakamura et al. | 725/105 |
| 2005/0204293 A1* | 9/2005 | Raghunathan et al. | 715/739 |
| 2005/0257170 A1* | 11/2005 | Kim et al. | 715/825 |
| 2006/0010399 A1* | 1/2006 | Lau | 715/853 |
| 2006/0173961 A1* | 8/2006 | Turski et al. | 709/206 |
| 2006/0268100 A1* | 11/2006 | Karukka et al. | 348/14.01 |
| 2006/0290666 A1* | 12/2006 | Crohas | 345/157 |
| 2007/0050697 A1* | 3/2007 | Lewis-Bowen et al. | 715/503 |
| 2007/0136681 A1* | 6/2007 | Miller | 715/782 |

* cited by examiner

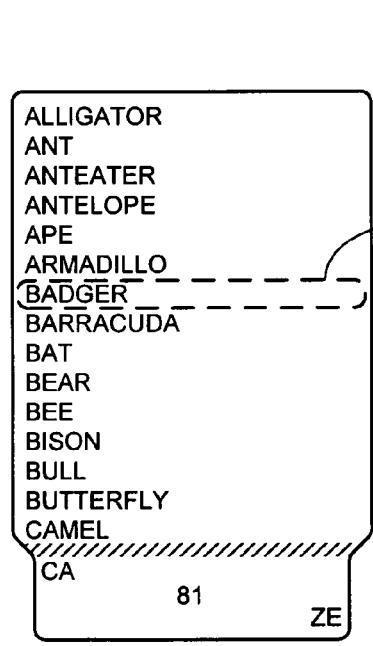
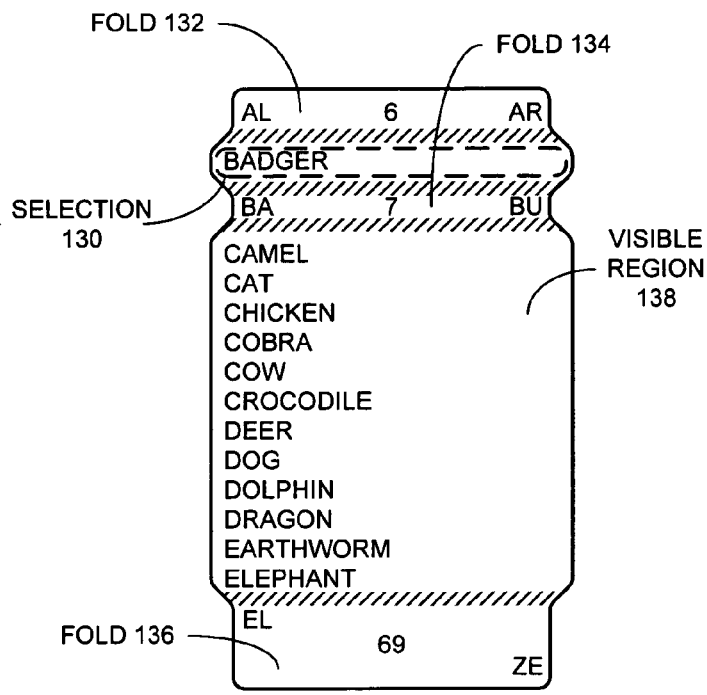
FIG. 1C
FIG. 1D

FOLDED SCROLLING

BACKGROUND

1. Field of the Invention

The present invention relates to techniques for displaying content on a computer display. More specifically, the present invention relates to a method and apparatus for displaying and navigating through content on a computer display by hiding content within "folds" in scrollable content.

2. Related Art

When content, such as text or graphics, is displayed on a computer screen (or a window on the computer screen), the content frequently requires more space for display than is available on the computer screen or window. Several techniques are presently used to solve this "limited-display" problem:

1. Scrolling: typically by using scrolling mechanisms along the edges of a window.
2. Panning: typically by using a "hand" graphic to drag the content from off-screen into the visible region within a window.
3. Scaling/Resizing the content to fit within the allotted display space.

A similar problem arises when a user wants to view points-of-interest within the content that are widely separated. One technique for displaying such content that is widely separated is to split a window into two or more "sub-panes." Each sub-pane can then be independently navigated through the content using one of the above mechanisms (scrolling, panning, and scaling/resizing) to display the desired points-of-interest within the content. The content between the points-of-interest is hidden off-screen.

Unfortunately, these existing mechanisms which are used to solve the above-described problems have limitations and are somewhat cumbersome and non-intuitive. Hence, what is needed is a less cumbersome and more intuitive method for displaying content on a computer display.

SUMMARY

One embodiment of the present invention provides a system that displays content on a computer display. During operation, the system displays the content items within a display area on the computer display, wherein content items surrounding a current point of interest are displayed within a visible region of the display area. If the visible region has insufficient space to display some of the content items, the system selects a portion of the content items to be collapsed. Next, the system collapses the selected content items into one or more folds within the display area, wherein a fold is a compact representation of a contiguous group of adjacent content items and is located in place of the contiguous group of adjacent content items. For each fold, the system then displays a summary of the collapsed content items in the fold.

In a variation on this embodiment, while collapsing the selected content items, the system collapses the selected content items into existing folds or into new folds within the visible region.

In a variation on this embodiment, if a user selects a new point of interest by selecting a given fold, the system expands the collapsed content items in the given fold so that the new point of interest is displayed in a visible region of the display area.

In a variation on this embodiment, while expanding the collapsed content items in the fold, if the visible region has insufficient space to display the collapsed content items in expanded form, the system collapses other content items into folds to make room for the expanded content items.

In a variation on this embodiment, while expanding the collapsed content items, if the visible region has insufficient space to display all of the expanded content items in the fold, the system expands only a portion of the collapsed content items in the fold.

In a variation on this embodiment, if a user selects a new point of interest within a fold and if there are a large number of collapsed content items within the fold, the system partitions the collapsed content items into sub-groups. Next, the system displays a summary of the collapsed content items within each sub-group in a sub-fold. If the user selects a given sub-fold, the system expands the collapsed content items in the given sub-fold so that the expanded content items are displayed in a visible region of the display area.

In a variation on this embodiment, if all of the collapsed content items in a given fold are displayed in expanded form, the given fold disappears.

In a variation on this embodiment, if the number of selected content items which are displayed restricts the number of displayed content items adjacent to the current point of interest to be below a minimum value, the system collapses some of the selected content items into folds within the visible region. For each fold, the system displays a summary of the selected content items in the fold, thereby freeing up space within the visible region for the content items adjacent to the current point of interest.

In a variation on this embodiment, the summary of the collapsed content items in the fold includes: a first content item in the fold, a quantifier for the number of collapsed content items in the fold, and a last content item in the fold.

BRIEF DESCRIPTION OF THE FIGURES

FIG. 1C illustrates a list with a fold in accordance with an embodiment of the present invention.

FIG. 1D illustrates a list with a selected item in accordance with an embodiment of the present invention.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. This includes, but is not limited to, magnetic and optical storage devices such as disk drives, magnetic tape, CDs (compact discs) and DVDs (digital versatile discs or digital video discs).

Folded Scrolling

In one embodiment of the present invention, folded scrolling replaces a scrollbar with a small fold in the content area that represents the content hidden in the fold. Using a pointing device to click on the fold causes content hidden in the fold to be displayed, and the previously-displayed content to be hidden into a new fold or an existing fold. In one embodiment of the present invention, a user can control which hidden content in the fold is displayed by clicking in different active areas in the fold.

In one embodiment of the present invention, a fold is a compact representation of multiple adjacent items in the list and is located in place of the multiple adjacent items in the list. A fold is displayed within the visible region of the content. For example, the visible region of the content can be within a window displayed on the computer screen. Consider the entire content to be displayed on the computer screen as being printed on a piece of paper. Excess content which cannot be displayed within the visible region of the content (for example, within a visible region of a list or of a window) is hidden by "folding" (collapsing) it out of sight.

In one embodiment of the present invention, if a user wants to see some of the collapsed content, the user clicks on an active area in the fold. The fold then expands to display the content collapsed in the fold. If there is more content within the fold than can be displayed in the visible region of the content, a portion of the content remains in the fold.

Figure 1A:
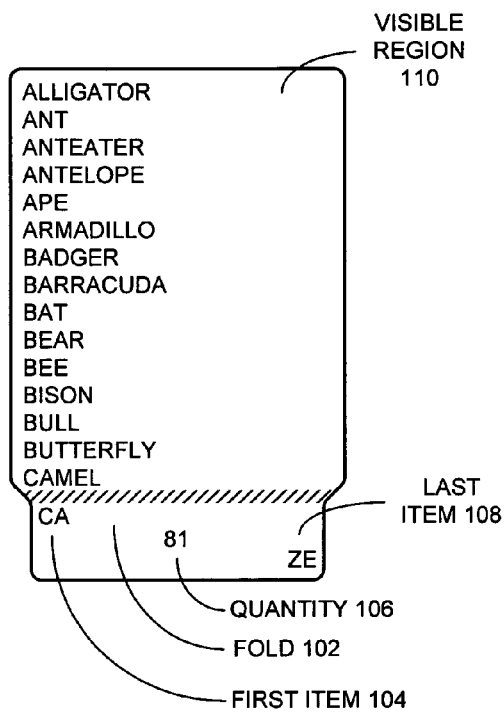
FIG. 1A illustrates a list with a fold in accordance with an embodiment of the present invention.

FIG. 1A illustrates a list with a fold in accordance with an embodiment of the present invention. The list includes fold 102 and visible region 110. Visible region 110 includes a list of selectable and visible items. Fold 102 includes items in the list not displayed in visible region 110. Fold 102 also includes a summary of the items in the fold. The summary includes first item 104, quantity 106, and last item 108.

First item 104 and last item 108 are abbreviations of the first item and the last item in the fold. Furthermore, quantity 106 is a number which indicates the number of items in the fold. In one embodiment of the present invention, first item 104, last item 108, and quantity 106 are visual cues which indicate that the fold is clickable.

In one embodiment of the present invention, clicking on a given visual cue produces a different action within the list. For example, clicking on the visual cue corresponding to the last element in the fold expands the fold starting from the last element in the fold. Clicking on the visual cue corresponding to the first element in the fold expands the fold starting from the first element in the fold. Clicking on the quantifier cue expands the next list of elements into the visible list region. Note that if the quantifier cue is clicked when the last element of the list is already displayed, the system expands elements above the currently displayed elements.

In one embodiment of the present invention, the list is any content that can be scrolled.

In one embodiment of the present invention, if the content is an alphabetized list, the fold displays the number of items hidden, and/or the first few letters of the first item and the last item.

In one embodiment of the present invention, the content is a text document. In one embodiment of the present invention, visible region 110 contains text from the text document. Fold 102 includes text not displayed in visible region 110. First item 104 and last item 106 are abbreviations for the first and last items in fold 102, which can include the first word and the last word of the text not displayed in visible region 110, respectively. Quantity 106 can include the word count, the character count, the number of pages, and the number of paragraphs.

In one embodiment of the present invention, the content is an image. If an image is too large to fit within the visible region of the content, the system displays a portion of the image corresponding to a point-of-interest and collapses the portions of the image not displayed into folds. Each fold includes a quantifier cue which indicates the amount of the image not displayed. In one embodiment of the present invention, the quantifier cue is a percentage of the image not displayed, or the quantifier cue can be a pixel count of the portions of the image not displayed. In another embodiment of the present invention, the quantifier cue is the number of pixels displayed or the percentage of the image displayed. Furthermore, the quantifier cue can include a total pixel count.

In one embodiment of the present invention, the system is used to display pull-down menus.

Figure 1B:
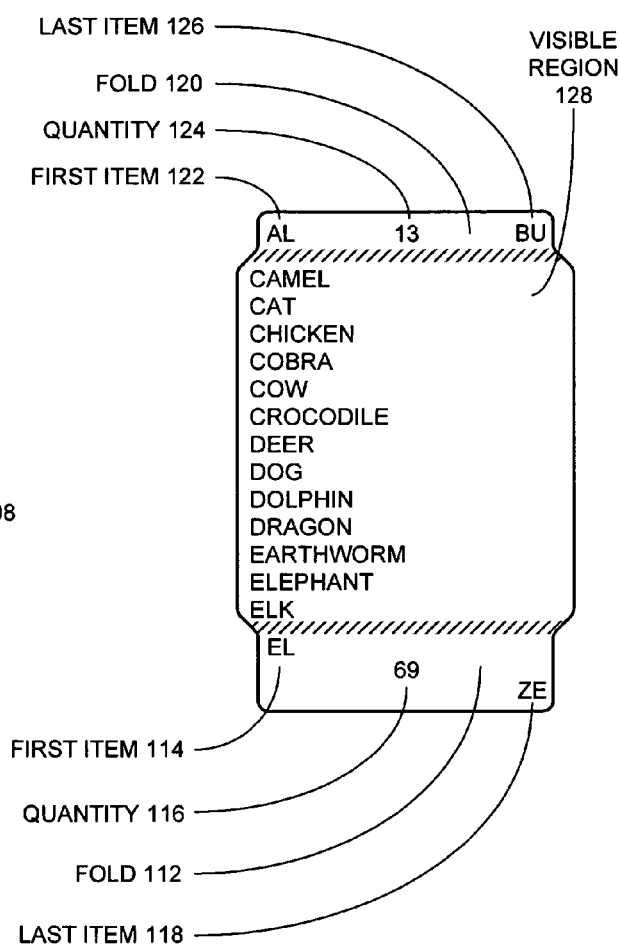
FIG. 1B illustrates a list with a top fold and a bottom fold in accordance with an embodiment of the present invention.

FIG. 1B illustrates a list with a top fold and a bottom fold in accordance with an embodiment of the present invention. The list in FIG. 1B includes folds 112 and 120, first items 114 and 122, last items 118 and 126, quantities 116 and 124, and visible region 128. Note that fold 120 includes items of the list which are before items displayed in visible region 128. Similarly, fold 112 includes items of the list which are after items displayed in visible region 128.

FIGS. 1C and 1D illustrate the structure of the list after selecting a list item. In FIG. 1C, the user selects "badger" (selection 130). FIG. 1D illustrates the structure of the list after the user either selects the first item in the fold (CA) or the quantifier portion of the field (81). In FIG. 1D, in addition to bottom fold 136, the system generates new folds 132 and 134 which bracket selection 130 (i.e. "badger"). Fold 132 includes a summary of items before selection 130 that were collapsed into fold 132. Fold 134 includes a summary of items after selection 130, but before the list of items displayed in visible region 138, that were collapsed into fold 134.

Note that each fold can contain multiple items. Also note that visible region 138 in FIG. 1D includes a different list of displayed items than the list of displayed items illustrated in FIG. 1C. Furthermore, note that the system can generate any number of folds depending on the current configuration of the list. For example, in one embodiment of the present invention, the system does not generate fold 134. In this embodiment visible region 138 includes a different list of displayed items than the list of displayed items illustrated in FIG. 1D. In another embodiment of the present invention, the system does not generate fold 132. In this embodiment, visible region 138 includes a different list of displayed items than the list of displayed items illustrated in FIG. 1D.

In one embodiment of the present invention, selected content is not collapsed into a fold. This makes it easy to view content from various areas by keeping the selected content visible. The user can then "fold scroll" to additional content.

In one embodiment of the present invention, when the user clicks on a fold to display new content, the previously-displayed content is collapsed into an existing fold, if available. Otherwise, a new fold is created to collapse some of the previously-displayed content. In one embodiment of the present invention, folds are typically placed at the edges of the content, but in some situations, there can be many folds at any point within the visible region of the content.

In one embodiment of the present invention, if all of the content collapsed in a fold is displayed, the fold disappears.

In one embodiment of the present invention, if the desired content is near one end of the fold, the user can click near that edge of the fold to display the content collapsed at that edge. For example, if the desired content is near the beginning of the fold (i.e. one of the first items in the fold), the user can click on the edge corresponding to the beginning of the content to expand the content from the beginning of the fold.

In one embodiment of the present invention, the left edge of the fold corresponds to the first items in the fold and the right edge of the fold corresponds to the last items in the fold.

In one embodiment of the present invention, selected content is folded when there is insufficient display space. When an existing fold is expanded, currently-displayed content is collapsed into a new or an existing fold if necessary. If there is selected content between the content to be folded and the edge of content where content would normally be folded, a new fold is created next to nearest selected content.

In one embodiment of the present invention, a fold at a location within the visible region of the content other than an edge splits the window into multiple display panes. If a user wants to view multiple bits of content that are widely separated, the user can select some of the content to be viewed, and then unfold the other content at other points-of-interest by clicking on the corresponding folds. Note that a new fold is created to hide the "uninteresting" content next to the nearest selected item.

In one embodiment of the present invention, the system attempts to keep selected content in the visible content region. In doing so, the system can create new folds to keep the selected content visible.

In one embodiment of the present invention, if there is selected content and the user then selects a new point-of-interest, the system collapses some of the currently-displayed, but not selected, content into a fold in order to display content adjacent to the new point-of-interest.

In one embodiment of the present invention, if the user clicks from the bottom of a list, the system expands the list from the bottom and creates a new fold above the items displayed, if necessary.

Note that the present invention does not use a scrollbar for navigation. The fold serves the dual purpose of hiding content and facilitating navigation to the hidden content.

In one embodiment of the present invention, multiple visible content regions can exist within the visible regions of the computer screen. For example, when expanding a fold, if there is enough room to expand the fold without collapsing other content into a fold, multiple visible content regions can exist.

The advantage of folding over traditional scrollbars is that the scrolling mechanism is integrated with the content in a more natural, metaphorical manner rather than requiring a separate control mechanism. Folding also eliminates the need for a pane-splitting control mechanism.

Sub-Folds

In one embodiment of the present invention, if there is a large amount of content collapsed in a fold, the fold expands to display smaller folds that the user can click on, thereby enabling the desired content to be displayed within a few clicks.

In one embodiment of the present invention, if there is content between two folds and a large amount of selected content above or below the fold, the system optimizes the display by collapsing some of the selected content into folds, thereby increasing the amount of content adjacent to the point-of-interest displayed in the visible region of the content.

In one embodiment of the present invention, if there is a long contiguous block of selected content, the system collapses the selected content into a single fold. For example, in a text document, a user may select one or more adjacent paragraphs. The system then collapses the selected paragraphs into a single fold.

Figure 2A:
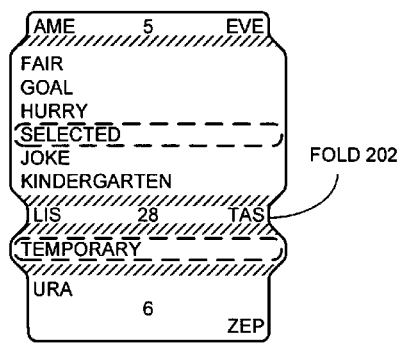
FIG. 2A illustrates a list with selected items in accordance with an embodiment of the present invention.
Figure 2B:
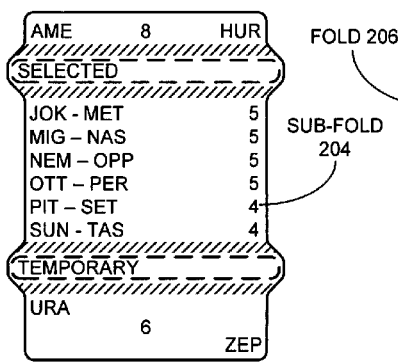
FIG. 2B illustrates a list with selected items and sub-folds in accordance with an embodiment of the present invention.
Figure 2C:
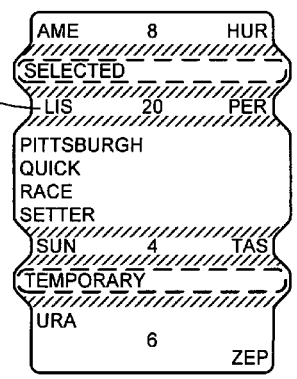
FIG. 2C illustrates a list with selected items and an expanded sub-fold in accordance with an embodiment of the present invention.

FIGS. 2A, 2B, and 2C illustrate a sequence of lists with sub-folds in accordance with an embodiment of the present invention. In FIG. 2A, the user selects two list items: "selected" and "temporary." FIG. 2B illustrates the structure of the list after the users clicks on an active area in fold 202 (i.e. LIS, 28, or TAS). In FIG. 2B, the system expands the fold 202 to display six sub-folds. Note that some existing displayed content in the visible region in FIG. 2A (list items "joke" and "kindergarten") have been collapsed, in FIG. 2B, into the first sub-fold in order to maximize the number of sub-folds displayed in the visible region. If a given fold contains too many items to display within a given visible list region, the system can partition the items in the fold into sub-folds to aid in quickly locating the desired item in the fold. In this embodiment, each sub-fold includes a summary of items in the sub-fold. Clicking on a given sub-fold causes the system to expand the given sub-fold. For example, the user selects sub-fold 204 in FIG. 2B, and the system displays the items in sub-fold 204 in FIG. 2C. In doing so, the system collapses the sub-folds above sub-fold 204 into fold 206 and leaves the sub-fold below sub-fold 204 as-is. Note that if there were more sub-folds below sub-fold 204, the system generates a new fold to collapse those sub-folds into the newly-generated fold.

Selecting/Deselecting and Expanding/Collapsing Items

Figure 3A:
FIG. 3A illustrates a list with a selected item in accordance with an embodiment of the present invention.
Figure 3B:
FIG. 3B illustrates the process of selecting a new item from the list in accordance with an embodiment of the present invention.
Figure 3C:
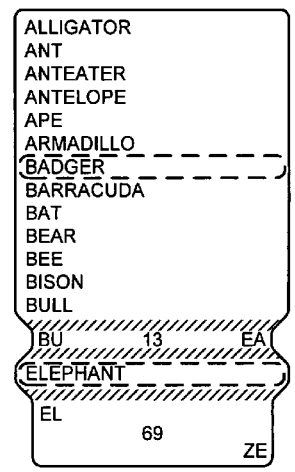
FIG. 3C illustrates the list with two selected items in accordance with an embodiment of the present invention.

FIGS. 3A-3F illustrate a sequence of lists resulting from selections, foldings, unfoldings, and deselections in accordance with an embodiment of the present invention. FIG. 3A illustrates a list with a single selected item ("badger"). In FIG. 3B, the user selects "elephant." FIG. 3C illustrates the structure of the list after the user: first clicks on the first item in the list (AL) or the quantifier (6) in the top fold, thereby fully expanding the top fold and collapsing content into the middle fold (BA, 7, BU) in FIG. 3B, and second clicks on the first item in the list (BA) or the quantifier (7) in the middle fold, thereby partially expanding the content in the middle fold in FIG. 3B and creating a new fold (BU, 13, EA) illustrated in FIG. 3C. Note that in doing so, the system collapses some of the items in the visible list region into the newly created fold.

Figure 3D:
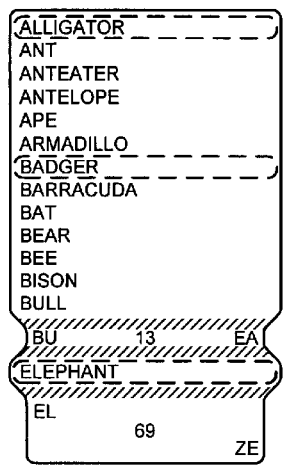
FIG. 3D illustrates the process of selecting a third item from the list in accordance with an embodiment of the present invention.
Figure 3E:
FIG. 3E illustrates the list with two selected items after deselecting one item in accordance with an embodiment of the present invention.

Next, the user selects item "alligator" in FIG. 3D. In FIG. 3E, the user: first deselected item "badger," then clicked on the first item in the fold (EL) or the quantifier (69) in the bottom fold, thereby collapsing content "ant" through "bull" into fold (BU, 13, EA), and finally clicked again on either the first item or the quantifier in the bottom fold (updated values for the fold are not shown), thereby expanding additional content from the bottom fold and causing fold (EL, 10, HA) to be generated. Note that the fold (EL, 10, HA) includes some of the items initially contained in the bottom fold in FIG. 3D, while other items from the bottom fold are displayed in the visible region, and yet other items remain in the bottom fold.

Figure 3F:
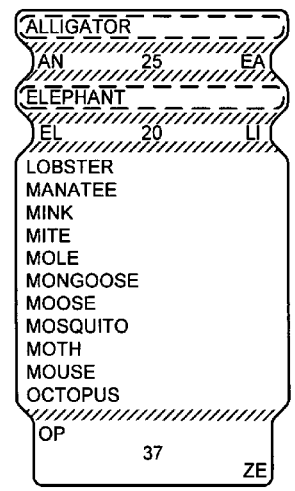
FIG. 3F illustrates the list with two selected items in accordance with an embodiment of the present invention.

In FIG. 3D the user clicked once more on either the first item (MA) or the quantifier (47) in the bottom fold, thereby expanding content "manatee" through "octopus" from that fold into the visible region above it and forcing the content that was displayed in the visible region ("hippo" through "lobster") to be collapsed into the fold (EL, 10, HA) above that region. The resulting fold (EL, 20, LI) is illustrated in FIG. 3F.

Computer System

Figure 4:
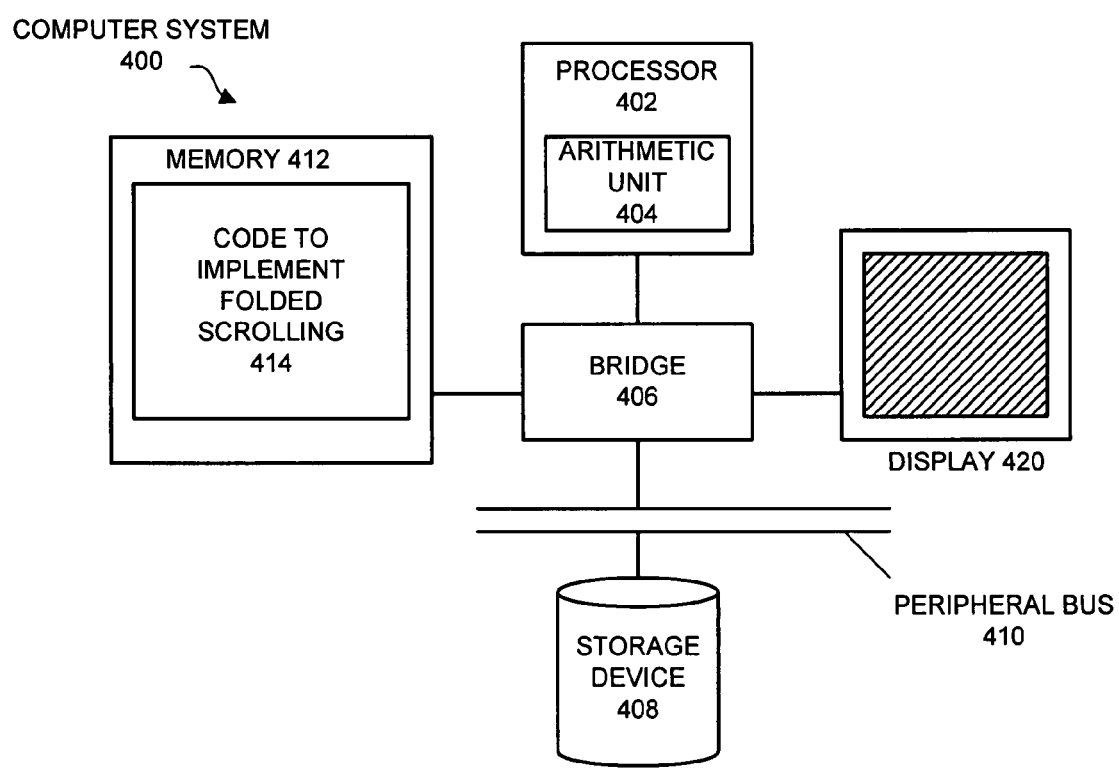
FIG. 4 illustrates a computer system in accordance with an embodiment of the present invention.

FIG. 4 illustrates a computer system 400 in accordance with an embodiment of the present invention. As illustrated in FIG. 4, computer system 400 includes processor 402, which is coupled to a memory 412, a display 420 and a peripheral bus 410 through bridge 406. Bridge 406 can generally include any type of circuitry for coupling components of computer system 400 together.

Processor 402 can include any type of processor, including, but not limited to, a microprocessor, a mainframe computer, a digital signal processor, a personal organizer, a device controller and a computational engine within an appliance. Processor 402 includes an arithmetic unit 404, which is capable of performing computational operations.

Processor 402 communicates with storage device 408 through bridge 406 and peripheral bus 410. Storage device 408 can include any type of non-volatile storage device that can be coupled to a computer system. This includes, but is not limited to, magnetic, optical, and magneto-optical storage devices, as well as storage devices based on flash memory and/or battery-backed up memory.

Processor 402 communicates with display 420 through bridge 406. Display 420 can include any type of computer system display that can be used to present a user interface that implements folded scrolling.

Processor 402 communicates with memory 412 through bridge 406. Memory 412 can include any type of memory that can store code and data for execution by processor 402. As illustrated in FIG. 4, memory 412 contains code to implement folded scrolling 414.

Note that although the present invention is described in the context of computer system 400 illustrated in FIG. 4, the present invention can generally operate on any type of computing device. Hence, the present invention is not limited to the computer system 400 illustrated in FIG. 4.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for displaying content items on a computer display, comprising:
   displaying the content items within a display area on the computer display, wherein the content items appear to a user to be located on a plane in the computer display, and wherein content items surrounding a current point of interest are displayed within a visible region of the display area;
   receiving a selected content item that is selected from the content items by the user, wherein the selected content item is between a first set of the content items and a second set of the content items;
   when the visible region has insufficient space to display some of the content items,
      selecting a portion of the content items to be collapsed, wherein the portion of the content items comprises the first set and the second set of the content items;
      collapsing the selected content items into at least two folds within the display area, wherein one of the folds corresponds to the first set of the content items and another of the folds corresponds to the second set of the content items, and wherein each fold in the folds appears to the user to be an inset area in the plane that conceals the corresponding set of the content items; and
   for each fold in the folds, displaying a summary for the corresponding set of the content items in a portion of the inset area for the fold, wherein the summary comprises a set of visual cues that include a first visual cue for the fold and a second visual cue for the fold, wherein clicking on the first visual cue causes the fold to expand into the visible region from a first content item in the fold down to another content item that is after the first content item in the fold, and wherein clicking on the second visual cue causes the fold to expand into the visible region from a last content item in the fold up to another content item that is before the last content item in the fold.

2. The method of claim 1, wherein collapsing the selected content items involves collapsing the selected content items into existing folds or into new folds within the visible region.

3. The method of claim 1, wherein if the user selects a new point of interest by selecting a given fold, the method further comprises expanding at least some of the collapsed content items in the given fold so that the new point of interest is displayed in a visible region of the display area.

4. The method of claim 3, wherein while expanding the at least some of the collapsed content items in the fold, if the visible region has insufficient space to display the at least some of the collapsed content items in expanded form, the method further comprises collapsing other content items into folds to make room for the expanded content items.

5. The method of claim 3, wherein while expanding the at least some of the collapsed content items, if the visible region has insufficient space to display all of the expanded content items in the fold, the method further comprises expanding only a portion of the at least some of the collapsed content items in the fold.

6. The method of claim 1, wherein if the user selects a new point of interest within a given fold in the folds and if there are a large number of collapsed content items within the fold, the method further comprises:
   partitioning the collapsed content items into sub groups;
   displaying a summary of the collapsed content items within each sub group in a sub fold; and
   if the user selects a given sub fold,
   expanding the collapsed content items in the given sub fold so that the expanded content items are displayed in a visible region of the display area.

7. The method of claim 1, wherein when all collapsed content items in a given fold in the folds are displayed in expanded form, the given fold disappears.

8. The method of claim 1, wherein if the number of selected content items which are displayed restricts the number of displayed content items adjacent to the current point of interest to be below a minimum value, the method further comprises:
  collapsing some of the selected content items into a second set of folds within the visible region; and
  for each fold in the second set, displaying a summary of the selected content items in the fold;
  thereby freeing up space within the visible region for the content items adjacent to the current point of interest.

9. A non-transitory computer-readable storage medium storing instructions that when executed by a computer cause the computer to perform a method for displaying content items on a computer display, the method comprising:
  displaying the content items within a display area on the computer display, wherein the content items appear to a user to be located on a plane in the computer display, and wherein content items surrounding a current point of interest are displayed within a visible region of the display area;
  receiving a selected content item that is selected from the content items by the user, wherein the selected content item is between a first set of the content items and a second set of the content items;
  when the visible region has insufficient space to display some of the content items,
    selecting a portion of the content items to be collapsed, wherein the portion of the content items comprises the first set and the second set of the content items;
    collapsing the selected content items into at least two folds within the display area, wherein one of the folds corresponds to the first set of the content items and another of the folds corresponds to the second set of the content items, and wherein each fold in the folds appears to the user to be an inset area in the plane that conceals the corresponding set of the content items; and
    for each fold in the folds, displaying a summary for the corresponding set of the content items in a portion of the inset area for the fold, wherein the summary comprises a set of visual cues that include a first visual cue for the fold and a second visual cue for the fold, wherein clicking on the first visual cue causes the fold to expand into the visible region from a first content item in the fold down to another content item that is after the first content item in the fold, and wherein clicking on the second visual cue causes the fold to expand into the visible region from a last content item in the fold up to another content item that is before the last content item in the fold.

10. The computer-readable storage medium of claim 9, wherein if the user selects a new point of interest by selecting a given fold, the method further comprises expanding at least some of the collapsed content items in the given fold so that the new point of interest is displayed in a visible region of the display area.

11. The computer-readable storage medium of claim 10, wherein while expanding the at least some of the collapsed content items in the fold, if the visible region has insufficient space to display the at least some of the collapsed content items in expanded form, the method further comprises collapsing other content items into folds to make room for the expanded content items.

12. The computer-readable storage medium of claim 10, wherein while expanding the at least some of the collapsed items, if the visible region has insufficient space to display all of the expanded content items in the fold, the method further comprises expanding only a portion of the at least some of the collapsed content items in the fold.

13. The computer-readable storage medium of claim 9, wherein if the user selects a new point of interest within a given fold in the folds and if there are a large number of collapsed content items within the fold, the method further comprises:
  partitioning the collapsed content items into sub groups;
  displaying a summary of the collapsed content items within each sub group in a sub fold; and
  if the user selects a given sub fold,
    expanding the collapsed content items in the given sub fold so that the expanded content items are displayed in a visible region of the display area.

14. The computer-readable storage medium of claim 9, wherein if the number of selected content items which are displayed restricts the number of displayed content items adjacent to the current point of interest to be below a minimum value, the method further comprises:
  collapsing some of the selected content items into a second set of folds; and
  for each fold in the second set, displaying a summary of the selected content items in the fold;
  thereby freeing up space within the visible region for the content items adjacent to the current point of interest.

15. An apparatus that displays content items on a computer display, comprising:
  a displaying mechanism configured to display the content items within a display area on the computer display, wherein the content items appear to a user to be located on a plane in the computer display, and wherein content items surrounding a current point of interest are displayed within a visible region of the display area;
  a receiving mechanism configured to receive a selected content item that is selected from the content items by the user, wherein the selected content item is between a first set of the content items and a second set of the content items;
  a folding mechanism, wherein, when the visible region has insufficient space to display some content items, the folding mechanism is configured to:
    select a portion of the content items to be collapsed, wherein the portion of the content items comprises the first set and the second set of the content items;
    collapse the selected content items into at least two folds within the display area, wherein one of the folds corresponds to the first set of the content items and another of the folds corresponds to the second set of the content items, and wherein each fold in the folds appears to the user to be an inset area in the plane that conceals the corresponding set of the content items; and
    for each fold in the folds, to display a summary for the corresponding set of the content items in a portion of the inset area for the fold, wherein the summary comprises a set of visual cues that include a first visual cue for the fold and a second visual cue for the fold, wherein clicking on the first visual cue causes the fold to expand into the visible region from a first content item in the fold down to another content item that is after the first content item in the fold, and wherein clicking on the second visual cue causes the fold to expand into the visible region from a last content item in the fold up to another content item that is before the last content item in the fold.

16. The method of claim 1,
wherein the first visual cue comprises an abbreviation for the first content item in the fold,
wherein the second visual cue comprises an abbreviation for the last content item in the fold, and
wherein the set of visual cues for the fold comprises a quantifier for a number of collapsed content items in the fold, wherein clicking on the quantifier causes the fold to expand into the visible region.

17. The method of claim 1, wherein at least one of the content items comprises an image, and wherein the method further comprises:
when the visible region has insufficient space to display at least some of the image, displaying a portion of the image and collapsing one or more other portions of the image into a fold.

18. The computer-readable storage medium of claim 9, wherein collapsing the selected content items involves collapsing the selected content items into existing folds or into new folds within the visible region.

19. The computer-readable storage medium of claim 9, wherein when all collapsed content items in a given fold in the folds are displayed in expanded form, the given fold disappears.

20. The apparatus of claim 15, wherein while collapsing the selected content items, the folding mechanism is configured to collapse the selected content items into existing folds or into new folds within the visible region content items into existing folds or into new folds within the visible region.

* * * * *